(12) United States Patent
Jung et al.

(10) Patent No.: US 12,196,304 B2
(45) Date of Patent: Jan. 14, 2025

(54) GEARWHEEL FOR AN ELECTRIC VEHICLE TRANSMISSION

(71) Applicant: ZF Friedrichshafen AG, Friedrichshafen (DE)

(72) Inventors: Andreas Jung, Schlier (DE); Matthias Wesa, Ravensburg (DE); Martin Gaber, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 226 days.

(21) Appl. No.: 17/604,257

(22) PCT Filed: Mar. 4, 2020

(86) PCT No.: PCT/EP2020/055600
§ 371 (c)(1),
(2) Date: Oct. 15, 2021

(87) PCT Pub. No.: WO2020/212010
PCT Pub. Date: Oct. 22, 2020

(65) Prior Publication Data
US 2022/0205522 A1   Jun. 30, 2022

(30) Foreign Application Priority Data

Apr. 17, 2019   (DE) .................. 10 2019 205 600.8

(51) Int. Cl.
*F16H 55/17*   (2006.01)
*F16H 48/08*   (2006.01)
(Continued)

(52) U.S. Cl.
CPC ............. *F16H 55/17* (2013.01); *F16H 48/08* (2013.01); *F16H 55/06* (2013.01); *F16H 55/12* (2013.01);
(Continued)

(58) Field of Classification Search
CPC ............... F16H 2048/385; F16H 55/12; F16H 2055/176
See application file for complete search history.

(56) References Cited

U.S. PATENT DOCUMENTS

| | | | | |
|---|---|---|---|---|
| 696,704 | A | * | 4/1902 | Allen ...................... F16H 48/08 475/230 |
| 1,658,571 | A | * | 2/1928 | Donald ................... F16H 48/08 475/230 |

(Continued)

FOREIGN PATENT DOCUMENTS

| | | |
|---|---|---|
| DE | 171033 C | 6/1906 |
| DE | 1116069 A | 10/1961 |

(Continued)

OTHER PUBLICATIONS

International Search Report (English Translation) PCT/EP2020/055600, dated May 5, 2020. (2 pages).

(Continued)

*Primary Examiner* — Daniel D Yabut
(74) *Attorney, Agent, or Firm* — Dority & Manning, P.A.

(57) ABSTRACT

A gearwheel (20) for a gear step in an electric vehicle transmission (18) includes a gearwheel carrier and a toothed ring (30) having an external toothing (42). The toothed ring is rotationally fixable to the gearwheel carrier. The gearwheel carrier is formed by a first partial carrier (38) and a second partial carrier (40) that are at least partially axially spaced apart and extend from the toothed ring radially inward. An axial spacing of the two partial carriers is greater, at least partially, than an axial length of the toothed ring.

17 Claims, 4 Drawing Sheets

(51) Int. Cl.
*F16H 48/38* (2012.01)
*F16H 55/06* (2006.01)
*F16H 55/08* (2006.01)
*F16H 55/12* (2006.01)

(52) U.S. Cl.
CPC .. *F16H 2048/085* (2013.01); *F16H 2048/385* (2013.01); *F16H 55/08* (2013.01); *F16H 2055/176* (2013.01)

(56) References Cited

U.S. PATENT DOCUMENTS

| | | | | |
|---|---|---|---|---|
| 4,688,962 | A * | 8/1987 | Koltookian | F16B 2/005 475/230 |
| 2003/0205426 | A1 * | 11/2003 | Lamela | B60K 17/356 180/305 |
| 2007/0068714 | A1 * | 3/2007 | Bender | B60K 6/28 180/65.29 |
| 2007/0254765 | A1 * | 11/2007 | Marsh | B60L 50/16 475/220 |
| 2010/0307845 | A1 | 12/2010 | Ogata | |
| 2012/0264559 | A1 * | 10/2012 | Mayr | F16H 48/24 29/893.1 |
| 2016/0363206 | A1 | 12/2016 | Modrzejewski et al. | |
| 2017/0299035 | A1 * | 10/2017 | Wakui | F16H 48/38 |
| 2020/0040980 | A1 | 2/2020 | Steven | |
| 2022/0097518 | A1 * | 3/2022 | Stadtfeld | B60K 17/354 |

FOREIGN PATENT DOCUMENTS

| | | |
|---|---|---|
| DE | 2653978 A1 | 6/1978 |
| DE | 112009002196 T5 | 1/2012 |
| DE | 102014000499 | 7/2015 |
| DE | 102017004933 | 11/2018 |
| WO | WO 2010/031322 A1 | 3/2010 |
| WO | WO 2015/106962 A2 | 7/2015 |
| WO | 2018/150175 | 8/2018 |
| WO | 2018/215227 A1 | 11/2018 |

OTHER PUBLICATIONS

German Office Action De 10 2019 205 600.8, dated Mar. 18, 2020. (10 pages).

German Office Action De 10 2019 205 600.8, dated Apr. 19, 2021. (10 pages).

* cited by examiner

GEARWHEEL FOR AN ELECTRIC VEHICLE TRANSMISSION

CROSS-REFERENCE TO RELATED APPLICATIONS

The present application is related and has right of priority to German Patent Application No. 102019205600.8 filed in the German Patent Office on Apr. 17, 2019 and is a nationalization of PCT/EP2020/055600 filed in the European Patent Office on Mar. 4, 2020, both of which are incorporated by reference in their entirety for all purposes.

FIELD OF THE INVENTION

The present invention relates generally to a gearwheel for an electric vehicle transmission and to an electric vehicle transmission with such a gearwheel and to an electric vehicle with such an electric vehicle transmission.

BACKGROUND

Spur gear drives are frequently installed in modern vehicles. Spur gear drives have advantages in the relatively simple design, since few moving parts are utilized and the externally toothed spur gears are comparatively easy to manufacture. One disadvantage is the small ratio that is implementable in one step. In addition, a spur gear drive is larger and, thereby, also heavier than, for example, a planetary transmission given the same power transmission capacity. In order to implement large ratios with one pair of spur gears, the circumference of at least one gearwheel is kept small, whereas the circumference of the second gearwheel is kept large. The coverage, i.e., the number of teeth in engagement, becomes that much smaller, the smaller is at least one of the engaged gearwheels. It must therefore be ensured that the individual teeth always enter into engagement.

Gearwheels that are utilized for transmitting turning motions and torques (power transmission) from an input shaft onto an output shaft must be dimensionally stable with respect to forces that act upon a gearwheel, in particular, during the power transmission.

In order to reduce the noise development, it is known to utilize helical-cut gearwheels. The teeth in this case no longer extend in a straight line in the axial direction, but rather obliquely at a certain angle with respect thereto. As a result, the force transmission does not set in abruptly on the entire face width, but rather only gradually increases. The entire face width is not engaged at the onset of the engagement. At the end of the engagement, the force transmission does not abruptly drop off. Instead, the tooth gradually slides out of the engagement. This particular engagement and disengagement behavior reduces the noise development of the transmission and increases the load capacity. Due to a helical gearing, in addition, more teeth are simultaneously engaged, as the result of which helical-cut gearwheels are particularly suitable for higher rotational speeds. Due to a helical gearing, however, an elevated axial load is exerted upon a gearwheel, which must be supported by the gearwheel and a gearwheel bearing.

The transmissions are exposed to enormous loads, in particular, during the utilization of electric prime movers that can reach very high rotational speeds, for example, in the range of twenty-thousand (20,000) revolutions per minute. It is therefore known to implement higher ratios using at least two gearwheel pairs. Transmissions of this type have relatively high transmission losses, however. Moreover, transmissions of this type are less suitable for weight-relevant applications, such as, for example, racing, since the implementation by at least two gearwheel pairs is weight-intensive.

In general, it is desirable to design transmissions to be lightweight and with low losses in the transmission, in order to keep the total weight of a vehicle low and to increase a drive force transmission in the drive train. A weight reduction is usually associated with a loss of the efficiency of the transmission. In particular in the case of highly loaded lightweight transmissions, it is known that all parts involved in the force transmission elastically deform, as the result of which gear meshing interferences and increased transmission losses can be induced.

SUMMARY OF THE INVENTION

Against this background, example aspects of the present invention provide a weight-optimized gearwheel, having as few losses as possible, for an electric vehicle transmission, and an electric vehicle transmission and an electric vehicle, which are preferably also suitable for use with helical teeth. In particular, an electric vehicle transmission and an electric vehicle are to be created, which are suitable for use in electric motorsports due to properties with respect to low weight and high stability even at very high rotational speeds.

Example aspects of the present invention provide a gearwheel for a gear step in an electric vehicle transmission, including a gearwheel carrier and a toothed ring having an external toothing, wherein the toothed ring is designed for being rotationally fixed to the gearwheel carrier. The gearwheel carrier is formed by a first partial carrier and a second partial carrier, which are axially spaced apart from each other, at least partially in sections, and extend from the toothed ring radially inward. The axial spacing of the two partial carriers with respect to each other is greater, at least partially or in sections, than an axial length of the toothed ring.

Example aspects of the present invention, furthermore, provide a toothed ring for an above-described gearwheel, having an external toothing. An outer diameter of the toothed ring has a ratio with respect to a shaft diameter of a shaft for the gearwheel in the range from six (6) to seven and seven-tenths (7.7).

Example aspects of the present invention also provide an electric vehicle transmission for an electric vehicle, including a gearwheel arrangement made up of an above-defined gearwheel and a pinion, which is in engagement with the gearwheel. The pinion is drivingly connectable to an electric prime mover. A center distance between a center of the pinion and a center of the gearwheel is in the range from fourteen and a half centimeters (14.50 cm) to twenty centimeters (20.00 cm), preferably in the range from seventeen centimeters (17.00) cm to eighteen and a half centimeters (18.50) cm, and particularly preferably in the range from seventeen and a half centimeters (17.50 cm) to eighteen centimeters (18.00) cm.

Example aspects of the present invention, furthermore, provide an electric vehicle having: an above-defined electric vehicle transmission; a differential, wherein the toothed ring is rotationally fixed to a housing of the differential, in order to form the gearwheel; and an electric prime mover, wherein a pinion is arranged, in a rotationally fixed manner, at an output shaft of the electric prime mover and is in engagement with the gearwheel, in order to multiply the input power of the electric prime mover.

It is understood that the features, which are mentioned above and which will be described in greater detail in the following, are usable not only in the particular combination indicated, but also in other combinations or alone, without departing from the scope of the present invention. In particular, the toothed ring, the electric vehicle transmission, and the electric vehicle can be designed according to the example embodiments described for the gearwheel.

Due to the utilization of a first partial carrier and a second partial carrier, the forces that act upon the gearwheel during an operation of the electric vehicle transmission can be advantageously distributed. A deformation of the gearwheel and/or a buckling or tilting of the toothed ring are/is counteracted. Moreover, the two partial carriers can be designed having a smaller wall thickness, which can reduce the weight of the gearwheel. Due to an axial spacing of the two partial carriers with respect to each other, which is greater, at least partially or in sections, than an axial length of the toothed ring, a force acting upon the gearwheel can be divided. A wide base is created for the gearwheel. A force acting upon the gearwheel can be better counteracted.

Due to the selection of a ratio of the outer diameter of the toothed ring with respect to a shaft diameter of a shaft for the gearwheel in the range from six (6) to seven and seven-tenths (7.7), a high ratio can be achieved with the gearwheel. Moreover, as a result, an optimal compromise can be found between the durability of a shaft for the gearwheel and weight.

Due to the selection of the center distance in the range from fourteen and a half centimeters (14.5 cm) to twenty centimeters (20.0 cm), a high ratio can be implemented by the gearwheel arrangement having only one gearwheel pair. Due to the selection of the center distance in the range from seventeen centimeters (17.0 cm) to eighteen and a half centimeters (18.5 cm), a compromise can be found between a ratio of the gear step of the gearwheel arrangement and the stability of the transmission shafts and bearings that are associated with the gearwheel arrangement. The mounting is made difficult as the center distance increases. In addition, the stability and, in particular, the quiet running of a gearwheel pair decrease. Due to the selection of the center distance in the range from seventeen and a half centimeters (17.5 cm) to eighteen centimeters (18.0 cm), a preferred compromise can be found between the stability of the gearwheel arrangement and the ratio in the gear step by the gearwheel arrangement.

Due to a rotationally fixed connection of an output shaft of the electric prime mover with the pinion and a rotationally fixed connection of a differential with the gearwheel, a drive train for the electric vehicle can be relatively simply designed, with few parts. Moreover, this configuration results in a weight-optimized drive train, since further gearwheels can be omitted.

In one advantageous example embodiment, the first partial carrier is formed by at least one section of a first housing section and the second partial carrier is formed by at least one section of a second housing section of a housing for a transmission component. As a result, a second function can be associated with the first housing section and the second housing section. Components in the transmission can be saved. The assembly of the transmission is simplified. In addition, the transmission is implementable in a cost-effective and weight-optimized manner due to the smaller number of necessary components.

In one advantageous example embodiment, the housing of the transmission component includes a radial area between the transmission component and the toothed ring, in order to enable a gearwheel diameter that is larger than a radial length of the transmission component. As a result, gearwheels having large diameters can be implemented, in particular having diameters that are greater than a radial extension of the transmission component. Particularly high ratios can be implemented with this type of gearwheel.

In one further advantageous example embodiment, a ratio of the radial length of the housing of the transmission component with respect to the radial length of the transmission component is greater than two (2), preferably greater than two and a half (2.5), and particularly preferably greater than three (3). As a result, gearwheels having large diameters can be implemented. Moreover, small transmission components can be utilized. It is possible to dimension the gearwheel and the transmission component according to the requirements independently of one another. The weight of an electric vehicle transmission having a gearwheel and a transmission component of this type can be further reduced. Moreover, the transmission losses can be kept low, since a dimensioning of the transmission component and of the gearwheel can be selected according to the requirements on the components and not according to a combinability of the components.

In one further advantageous example embodiment, the transmission component includes a differential, wherein the housing of the differential is preferably formed from housing sections that are symmetrical at least partially or in sections thereof. Due to the utilization of the gearwheel with a differential, the gearwheel is suitable, in particular, as an output gearwheel. A further gear stage is not necessary in order to transmit an output power multiplied by the gearwheel onto an output axle. The electric vehicle transmission having a gearwheel of this type is compact. Due to the housing sections that are symmetrical at least in sections thereof, the operation is possible in both directions of rotation under equal loads. This is advantageous, in particular, in the case of electric vehicle transmissions, in which recuperation is implemented at times.

In one preferred example embodiment, the toothed ring is connected to the gearwheel carrier in a form-locking, friction-locking, and/or force-locking manner, preferably by bonding, screwing, pressing, and/or welding the toothed ring to/into the gearwheel carrier. As a result, a connection between the toothed ring and the gearwheel carrier is achieved on the greatest possible circumference, which considerably reduces the load, in particular on the connection. The gearwheel becomes more durable and an electric vehicle transmission having a gearwheel of this type becomes more reliable.

In one preferred example embodiment, the first partial carrier and/or the second partial carrier include(s) a reinforcement, preferably in the form of a support grid arranged at the partial carrier, having a honeycomb pattern and/or a waffle pattern, in order to counteract axial loads acting upon the gearwheel during an operation of the electric vehicle transmission. As a result, the first partial carrier and/or the second partial carrier can be optimized in terms of weight. In particular, a small wall thickness can be provided for the partial carriers and a weight-optimized reinforcing means can be utilized. It is conceivable to manufacture the reinforcement from another material, which, in particular, meets requirements on lightweight design and stability, and to apply the reinforcement at the partial carrier using a lamination process, (CF) print process, welding process, and/or bonding process. It is also conceivable to integrally form the reinforcement with at least one of the partial carriers, for example, by solid forming, casting, and/or machining the partial carrier.

In one preferred example embodiment, the external toothing has a module in the range from one millimeter (1.0) mm to one and eight-tenths millimeters (1.8 mm), preferably in the range from one millimeter (1.0 mm) to one and fifty-three hundredths millimeters (1.53 mm), and particularly preferably of one and fifty-one hundredths millimeters (1.51 mm). Additionally or alternatively, the external toothing has helical teeth having a helix angle β (beta) in the range from five degrees (5°) to forty-five degrees (45°), preferably in the range from fifteen degrees (15°) to thirty-five degrees (35°), and particularly preferably in the range from twenty degrees (20°) to thirty degrees (30°). Additionally or alternatively, the toothed ring has an outer diameter in the range from twenty-six centimeters (26 cm) to thirty-four centimeters (34 cm), in particular in the range from twenty-eight centimeters (28 cm) to thirty-two centimeters (32 cm), and particularly preferably of thirty-one and forty-eight hundredths centimeters (31.48 cm). Additionally or alternatively, the external toothing has a tooth depth in the range from one millimeter (1.0 mm) to two and a half millimeters (2.5 mm), in particular in the range from one and two tenths millimeters (1.2 mm) to two millimeters (2.0 mm), and particularly preferably of one and a half millimeters (1.5 mm). Additionally or alternatively, the toothed ring is made of metal, in particular of case hardened steel. Due to the selection of a module in the range from one millimeter (1.0 mm) to one and eight tenths millimeters (1.8 mm), the rolling losses on the gearwheel teeth and, thereby, the transmission losses, can be kept low. Due to a selection of the module in the range from one millimeter (1.0 mm) to one and fifty-three hundredths millimeters (1.53 mm), a preferred range can be found, which permits sufficient power to be transmitted by the gearwheel teeth, without the need to accept high transmission losses. Due to the selection of a module of one and fifty-one hundredths millimeters (1.51 mm), a preferred compromise can be found between the machinability of the gearwheel, the transmission of sufficient drive force/torque, and the reduction of the transmission losses. Due to the selection of a helical gearing having a helix angle β (beta) in the range from five degrees (5°) to forty-five degrees (45°), a low noise operation can be improved and a noise development can be reduced, since each pair of teeth comes into and out of engagement with a continuous transition and, thereby, the transmission of the torque takes place more uniformly. Due to the selection of a helical gearing having a helix angle β (beta) in the range from fifteen degrees (15°) to thirty-five degrees (35°), a preferred range can be found, which permits a low noise operation and low noise development to be achieved, without the need to accept high axial loads, which must be supported by appropriate bearings and gearwheel geometries. Due to the selection of a helical gearing having a helix angle β (beta) in the range from twenty degrees (20°) to thirty degrees (30°), a preferred compromise can be found between the sizing of the bearings and of the gearwheel and a sufficient low noise operation. Due to the selection of a gearwheel diameter in the aforementioned range, particularly high ratios can be implemented with the gearwheel. Due to the selection of the tooth depth of the gearwheel in the range from one millimeter (1.0 mm) to two and a half millimeters (2.5 mm), a sufficient meshing of teeth can be achieved. Due to the selection of the tooth depth in the range from one and two-tenths millimeters (1.2 mm) to two millimeters (2.0 mm), a compromise can be found between the machinability of the gearwheel and a sufficient meshing of teeth. Due to the selection of a tooth depth of one and a half millimeters (1.5 mm), the gearwheel can have a sufficient meshing of teeth in combination with efficient machinability. In addition, the rolling losses of the teeth of the gearwheel and, thereby, of the electric vehicle transmission are low. Due to the formation of the toothed ring from metal, preferably from case hardened steel, the durability of the toothed ring can be increased. Moreover, the manufacture of the toothed ring having efficient, small modules in the toothing is considerably simplified, since, for example, hardness-induced distortions, etc., can be reduced by providing a toothed ring.

In one further preferred example embodiment, the external toothing has a spur gear tooth system or a bevel gear cutting. Additionally or alternatively, the external toothing is preferably designed in the form of an involute gearing and, particularly preferably, with an addendum modification. Due to the provision of a bevel gear cutting or a spur gear tooth system, an arrangement of an electric prime mover can take place according to the available installation space. Moreover, the gearwheel can be produced in a cost-effective and technically easy way. Due to the provision of an involute profile, preferably with an addendum modification, the rolling behavior of the teeth of the gearwheel can be improved. The losses in the electric vehicle transmission can be further reduced.

In one further preferred example embodiment, the first partial carrier has a profile in the radial direction that differs from the second partial carrier. Additionally or alternatively, the first partial carrier has a wall thickness that differs from the second partial carrier. As a result, the thickness and the profile can be adapted to the requirements on the gearwheel. In particular, as a result, the weight can be further reduced. The preferred direction of rotation can be taken into consideration here, in order to find an optimal compromise between the durability of the gearwheel and the weight.

In one further preferred example embodiment, the electric vehicle transmission has a single gear step, which is established by the gearwheel arrangement. As a result, the electric vehicle transmission can be simply designed, with few parts. Moreover, this configuration results in a weight-optimized electric vehicle transmission, since further gearwheels can be omitted. The number of meshing points can be reduced, as the result of which transmission losses can be reduced. Due to the utilization of a single gear step, the instances of meshing of teeth and, thereby, the tooth losses in the entire transmission are reduced. Overall, the total losses in the transmission are drastically reduced in combination with a similar acoustic acceptance. The transmission can be made narrower, more cost-effective, and more efficient. The overall efficiency can become very high, in particular over ninety-nine percent (99%).

In one further preferred embodiment, the gearwheel arrangement is designed for forming a ratio in the range of greater than five and a half (5.5), preferably greater than eight (8), and particularly preferably equal to eight and nine-tenths (8.9). Due to the selection of a ratio of the gearwheel arrangement of greater than five and a half (5.5), a high transmission ratio can be implemented with only one gearwheel pair. Due to a ratio of greater than eight (8.0), a torque and/or speed ratio can be implemented in a wide range using only one gearwheel arrangement. For example, a high ratio of the torque of a high-torque electric prime mover can be achieved. Moreover, a high reduction of the rotational speed of an electric prime mover can take place. A high reduction is advantageous, in particular, for race vehicles, which are designed for maximum speed and a light weight. Race vehicles are preferably equipped with lightweight electric prime movers, which preferably reach high rotational speeds. A ratio of eight and nine-tenths (8.9) represents a compromise between quickly pulling away from rest and an achievable maximum speed as a function of the rotational speed of the electric prime mover. Moreover, a transmission ratio of eight and nine-tenths (8.9) yields an advantageous relationship of weight and ratio.

The gearwheel according to the invention can also be advantageously utilized for establishing a gear step in other areas of application. In particular, an application in rail transport (trains, streetcars, etc.), in wind power (transmissions for wind turbines), in armament (tanks, large equipment, etc.), and for watercraft (pleasure boats, cargo ships, etc.) is conceivable. The advantages of the gearwheel according to example aspects of the invention can also be utilized in these areas of application.

The module m is the ratio between the pitch circle diameter of the gearwheel and the number of teeth of the gearwheel. The pitch circle diameter is the diameter of an imaginary cylinder, which extends through the center of the teeth. The pitch circle is defined as a circle, the center of which is situated on the gearwheel axis, which extends through the pitch point of the gearwheel teeth. This pitch point is located between the root of the gearwheel tooth (root diameter) and the tip of the gearwheel tooth (outside diameter). The module, therefore, is a measure for the distance between two adjacent gearwheel teeth. The gearwheel diameter or the outer diameter is to be understood, in particular, as the outside diameter in the present case.

Gearwheels can be designed and machined with an addendum modification. The shape of the teeth is changed without changing the underlying base curve. In the case of a gearwheel with an addendum modification, as compared to a gearwheel without an addendum modification, another part of the same curve is utilized as the tooth flank. In the case of gearwheels with addendum modification (often also referred to as "corrected gearwheels"), the outside diameter and the root diameter change by 2*x*m.

Recuperation is a recuperation of energy during a braking procedure. A recuperation brake, which is also referred to as a regenerative brake, operates in a wear-free manner, as is the case for any electrodynamic brake. The braking effect arises in that the drive motors are operated as electric generators. The electrical energy can be stored in the vehicle, for example, in an accumulator or a supercapacitor.

A honeycomb pattern and/or a waffle pattern are/is preferably formed by at least one group of recesses, wherein the group of recesses is formed by a repeating basic shape. Preferably, two basic shapes of a group are depictable on one another. The recesses can be continuous and/or indentations in a disk.

CF is to be understood in the present case as carbon fiber. Carbon fibers can be embedded in a material matrix. The matrix is utilized for connecting the fibers and for filling the gaps. As a result, a robust and lightweight material arises, which is utilized, in particular, in motorsports. Epoxy resin is usually selected as the matrix. Other thermo-setting plastics or also thermo-plastics are also possible as a matrix material.

BRIEF DESCRIPTION OF THE DRAWINGS

Example aspects of the invention are described and explained in greater detail in the following with reference to a few selected exemplary embodiments in conjunction with the attached drawings, in which.

DETAILED DESCRIPTION

Figure 1:
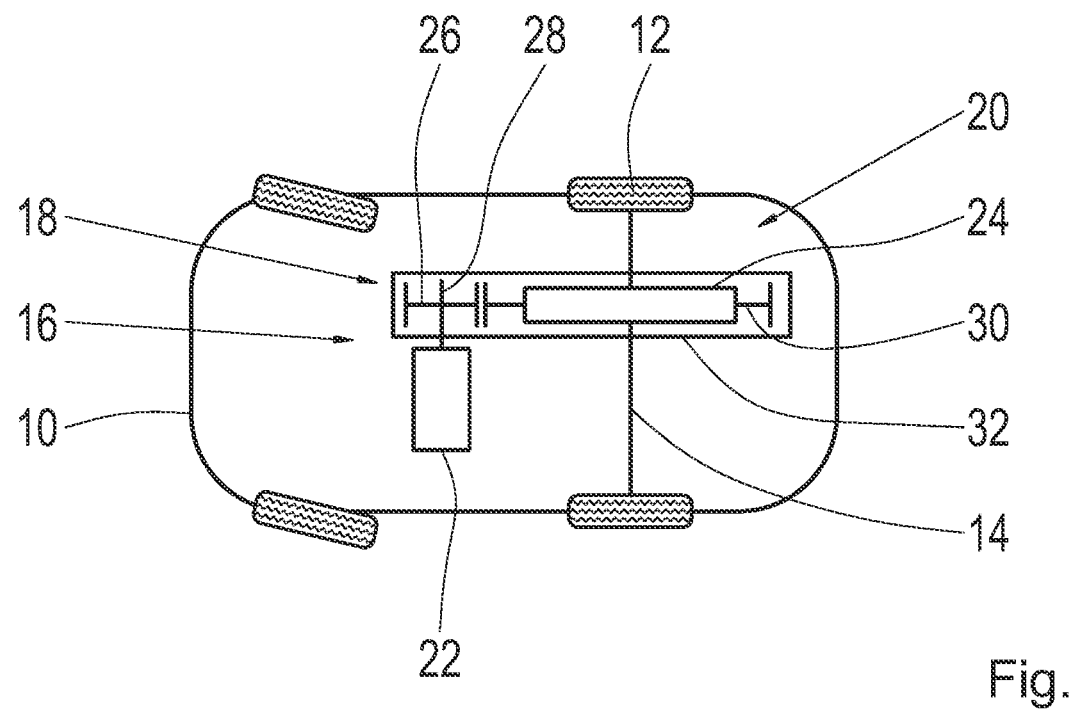
FIG. 1 shows a schematic of an electric vehicle with an electric vehicle transmission having a gearwheel according to example aspects of the present invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIG. 1, an electric vehicle 10 with driving wheels 12, a drive shaft 14 operatively connected to the driving wheels 12, and a drive train 16 is diagrammatically shown. The figure corresponds to a top view. The relevant components are represented enlarged and not true to scale. The drive train 16 includes an electric vehicle transmission 18 with a gearwheel pair having a gearwheel 20 according to the present application, an electric prime mover 22, and a transmission component 24. In the represented example, the transmission component 24 is a differential. The electric prime mover 22 is operatively connected to a pinion 26, which is arranged, in a rotationally fixed manner, at an output shaft 28 of the electric prime mover. The pinion 26 is in engagement with the gearwheel 20, which is formed by a toothed ring 30, which is arranged at the transmission component 24. The toothed ring 30 is rotationally fixed to a housing of the transmission component 24. By the transmission component 24, which includes a differential, a drive force can be transferred to the driving wheels 12. The pinion 26, the gearwheel 20, and the transmission component 24 can be accommodated in a transmission housing 32.

Figure 2:
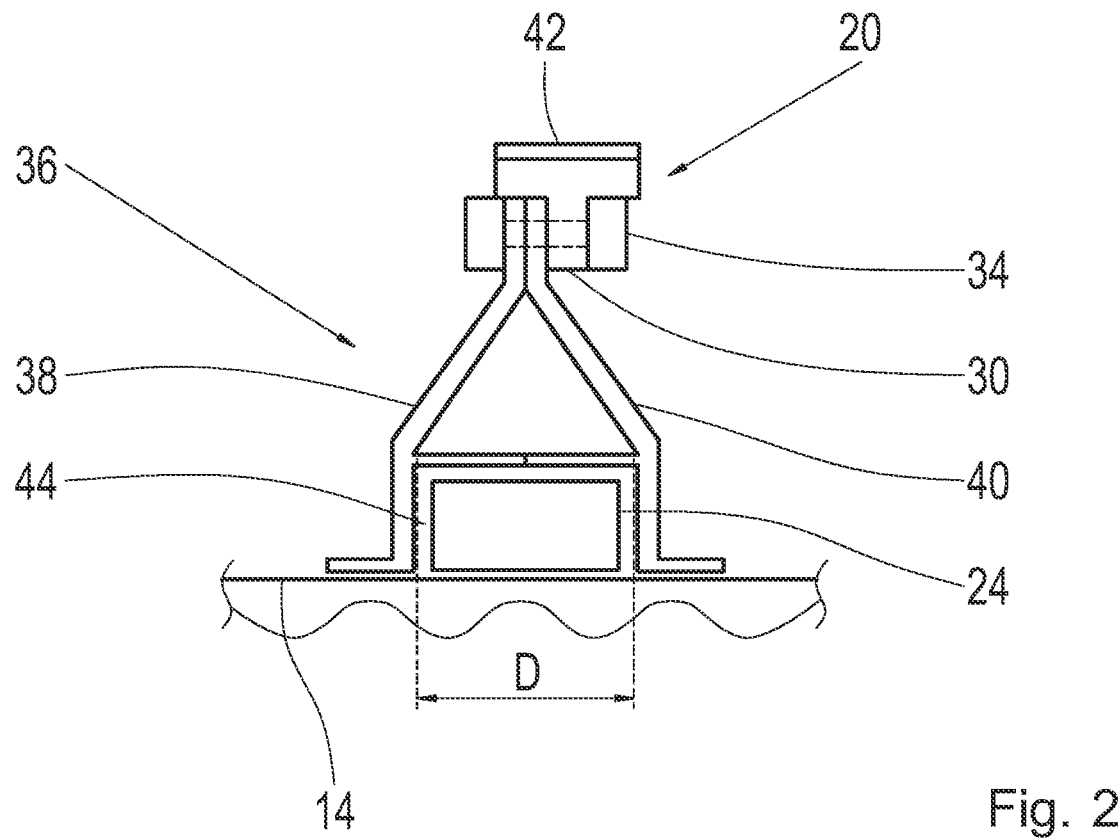
FIG. 2 shows a schematic of a gearwheel according to the invention in a first example embodiment.

FIG. 2 shows a schematic of a gearwheel 20 according to the present application in a first example embodiment. The gearwheel 20 includes a toothed ring 30, which is rotationally fixed at a housing 36 by a screw 34 in this example. The housing 36 has a first housing section and a second housing section and is arranged at the input shaft 14. The first housing section is utilized as a first partial carrier 38 and the second housing section is utilized as a second partial carrier 40 of the gearwheel 20. In this example, the gearwheel 20 is designed as a spur gear. The toothed ring 30 therefore has an external toothing 42 in the form of a spur gear tooth system. The transmission component 24, which includes a differential, is accommodated in the housing 36 in a cavity 44 provided therefor. For the sake of clarity, the representation of a transmission housing and of bearings was omitted. The housing 36 has, in addition to the cavity 44 for the transmission component 24, a further section extending radially outward, in order to be able to select the outer diameter of the gearwheel 20 independently, in particular greater than a radial extension of the transmission component. In this example, the first housing section or the first partial carrier 38 is designed symmetrically to the second housing section or the second partial carrier 40. If the transmission component is a differential, the first housing section is also referred to as a differential case and the second housing section is also referred to as a differential cover.

It is understood that an asymmetrical design can also be provided, depending on the demand for installation space and geometry of the drive train 16. The external toothing 42 can be designed in the form of a helical gearing. High forces are exerted upon the gearwheel 20 in the axial direction during operation. The symmetrical configuration of the first housing section and of the second housing section results in a consistent durability of the gearwheel 20 regardless of the direction of rotation.

Moreover, it can also be provided to adapt the radial profile of the first partial carrier 38 and/or of the second partial carrier 40 according to a preferred direction of rotation of the gearwheel 20, in order to be able to better support the arising axial loads. A weight-optimized gearwheel carrier in the form of the first partial carrier 38 and the second partial carrier 40 can be provided. For example, the wall thickness can be varied, preferably reduced, when a lower axial load is to be expected. It can also be provided to provide a profile for at least one of the two partial carriers 38, 40 that is essentially straight in the radial direction. For example, in order to oppose the resultant axial force for a direction of rotation, in which the electric vehicle 10 is accelerated, a partial carrier 38, 40, in the form of a housing section, that is as long as possible in order to be able to better counteract the axial force.

In FIG. 2, the first partial carrier 38 is arranged at a radially outer end adjacent to the second partial carrier 40, wherein, offset with respect thereto, the toothed ring 30 is screwed onto the housing 36. It is understood that the toothed ring can also be welded or bonded onto the housing 36, and/or pressed together with the housing 36. In general, any force-fit connection, frictional connection, and/or positive engagement is conceivable, in order to rotationally fix the toothed ring 30 to the housing.

In the following, the differences between the individual embodiments are to be discussed. Identical reference characters refer to identical features and are not explained once more.

Figure 3:
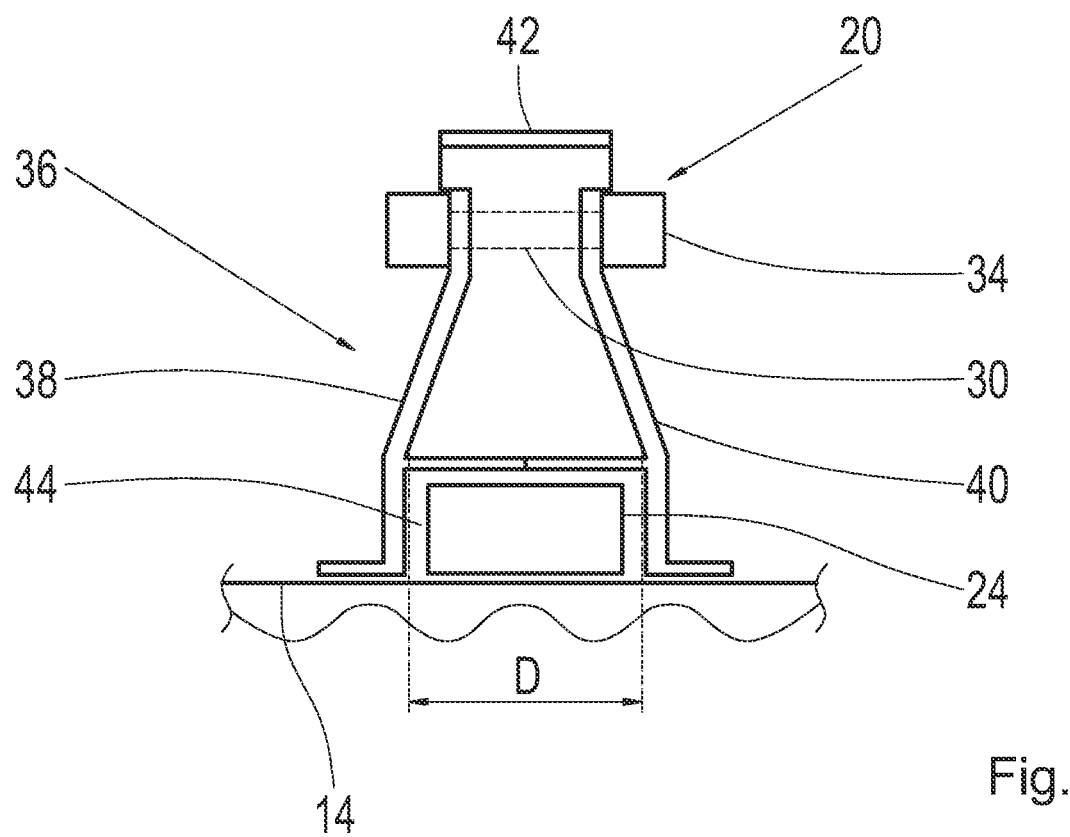
FIG. 3 shows a schematic of a gearwheel according to the invention in a second example embodiment.

In FIG. 3, a schematic of a gearwheel 20 according to the present application is shown in a second example embodiment. Here, the toothed ring 30 is arranged between the first partial carrier 38 (first housing section) and the second partial carrier 40 (second housing section). The toothed ring 30 can be supported at the two axial ends by the first partial carrier 38 and the second partial carrier 40. Preferably, the screw 34 can be smaller-dimensioned, since less force is transmitted via the screw 34 during the operation of the electric vehicle transmission 18. The toothed ring 30 is situated partially on the first partial carrier 38 and the second partial carrier 40. Preferably, a better part of the force is transmitted directly into the first partial carrier 38 and/or the second partial carrier 40. Similarly to the screw, the press-fit, clamping, bonded, and/or welded connection between the toothed ring 30 and the housing 36 can also be smaller-dimensioned. Preferably, weight can be further saved as a result.

In the example embodiments according to FIGS. 2 and 3, an external toothing 42 in the form of a spur gear tooth system is provided. An electric prime mover 22 is arranged essentially in parallel to the input shaft 14. The arrangement according to FIGS. 2 and 3 corresponds to the schematic in FIG. 1.

Figure 4:
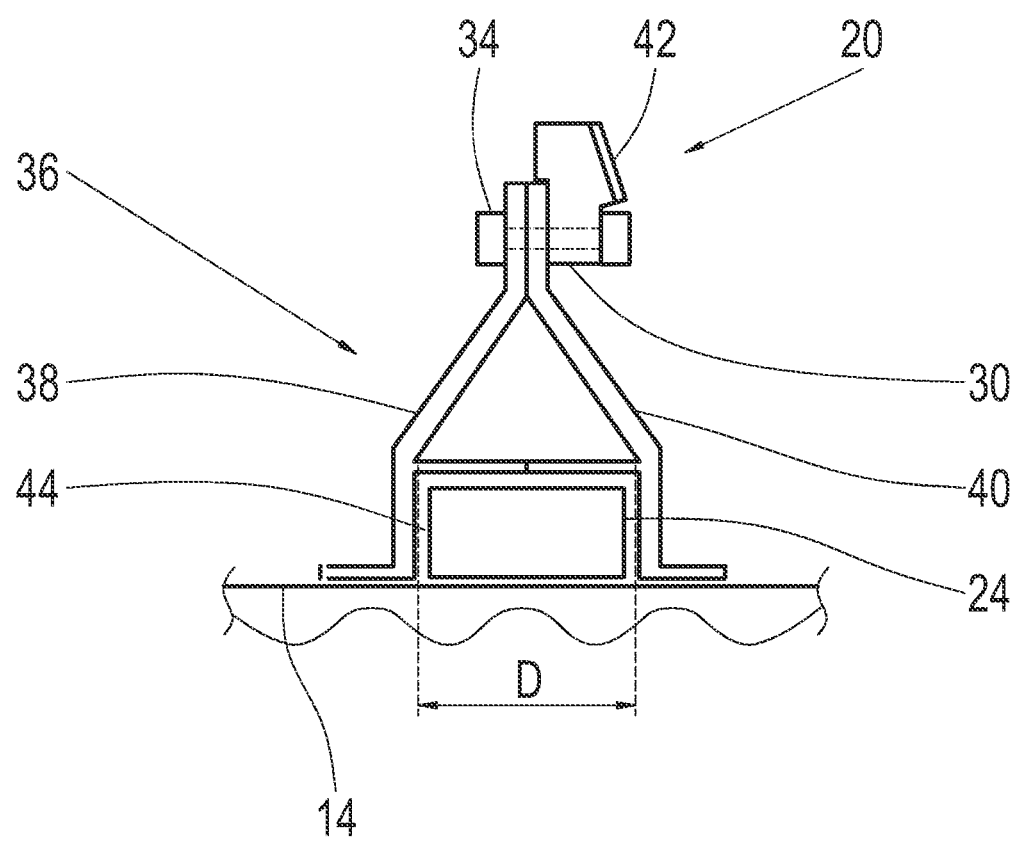
FIG. 4 shows a schematic of a gearwheel according to the invention in a third example embodiment.

In FIG. 4, a schematic of a gearwheel 20 according to the invention is shown in a third example embodiment. Here, the toothed ring 30 of the gearwheel 20 has an external toothing 42 in the form of a bevel gear cutting. As a result, the electric prime mover 22 can be arranged essentially perpendicularly to the input shaft 14. It is understood that, in this example embodiment as well, the toothed ring 30 can be arranged next to the housing 36 as shown in FIG. 4 or, similarly to the embodiment shown in FIG. 3, between the two partial carriers 38, 40.

Figure 5:
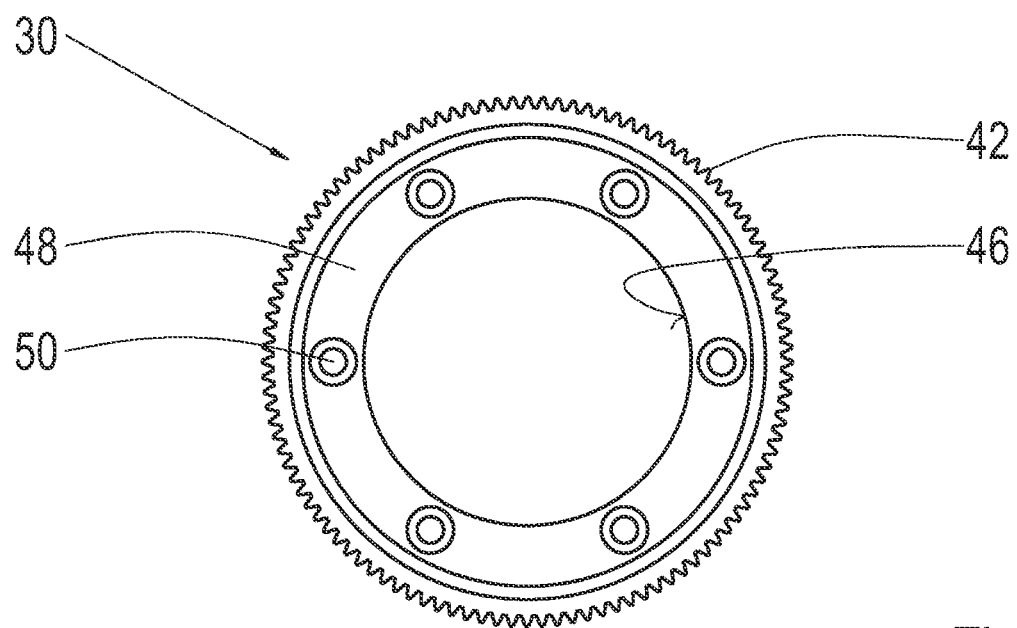
FIG. 5 shows a diagrammatic top view of a toothed ring of a gearwheel according to example aspects of the invention.

In FIG. 5, a diagrammatic top view of a toothed ring 30 according to example aspects of the invention is shown. The toothed ring 30 has an external toothing 42 in the form of a spur gear tooth system in this example. A fastening section 48 is located between a toothed-ring inner side 46 and the external toothing 42, in order to connect the toothed ring 30 to the housing 36. In this example, bore holes 50 are provided for this purpose, in order to make it possible to screw on the toothed ring 30. The fastening section 48 can also have a bonding, press-fit, clamping, and/or welding surface, however, in order to fasten the toothed ring 30 at the housing 36.

Figure 6:
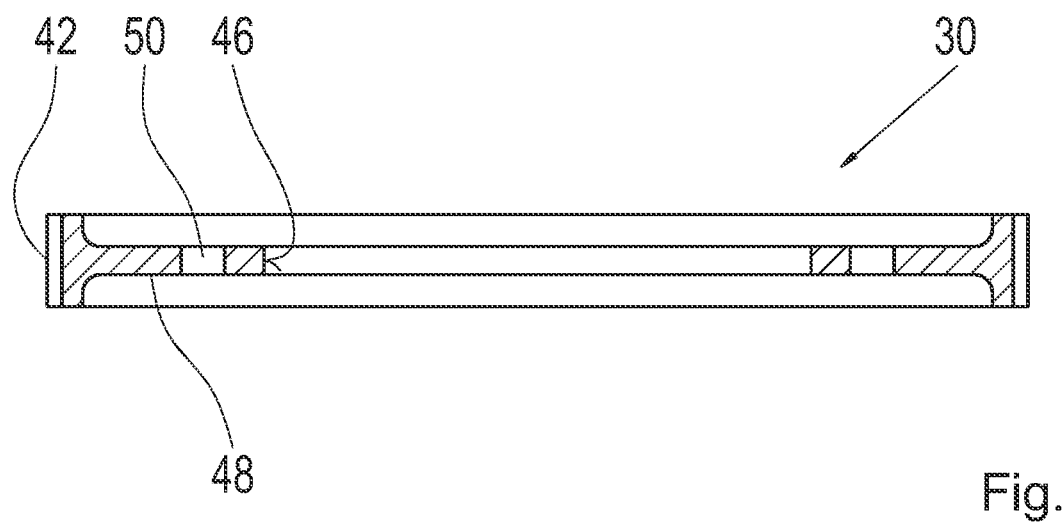
FIG. 6 shows a diagrammatic sectioning of a toothed ring of a gearwheel according to example aspects of the invention.

In FIG. 6, a sectioning of the toothed ring 30 according to FIG. 5 is shown. The cut edge extends through the centers of two radially opposed bore holes 50. The toothed ring 30 shown in FIGS. 5 and 6 has a helical-cut spur gear tooth system. It is understood that the toothed ring 30 can also have a bevel gear cutting. Preferably, the toothing has a module of one and fifty-three hundredths millimeters (1.53) mm, wherein the helix angle $\beta$ is twenty-five degrees (25°). The outer diameter of the toothed ring 30 is thirty-one and forty-eight hundredths centimeters (31.48 cm). The depth of the external toothing is one and a half millimeters (1.5 mm). The toothed ring 30 is provided for a gearwheel that can be arranged at a shaft (not shown) having a diameter in the range from four and a half centimeters (4.5 cm) to five centimeters (5 cm).

The toothed ring 30 is formed from case hardened steel, wherein the hardening process can be advantageously carried out due to the provision of a toothed ring 30 that is mounted onto a housing 36. A toothed ring has a smaller radial distance than a gearwheel, and so a distortion in a hardening process is less than is the case with a gearwheel.

Figure 7:
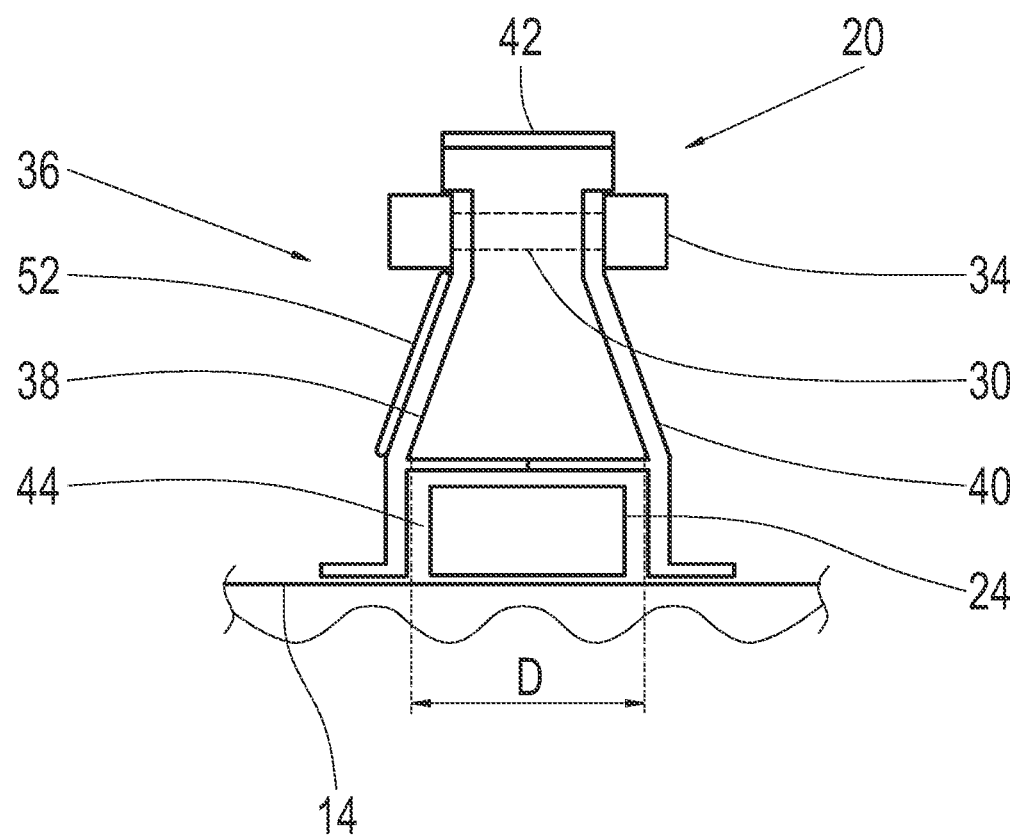
FIG. 7 shows a schematic of a gearwheel according to the invention in a fourth example embodiment.

In FIG. 7, a schematic of a gearwheel 20 according to the invention is shown in a fourth example embodiment. The gearwheel essentially corresponds to the gearwheel 20 shown in FIG. 3. In the represented example, the first partial carrier 38 is reinforced by a reinforcement 52 in the form of a disk, which has a waffle pattern and/or a honeycomb pattern. It is understood that the reinforcement can also be arranged on the second partial carrier 40 or on both partial carriers 38, 40. This disk can be bonded onto at least one of the partial carriers 38, 40, i.e., welded or integrally formed with one of the partial carriers 38, 40. It is also conceivable to crimp or press such a disk into a partial carrier 38, 40.

In general, any known production possibility is conceivable, in order to provide a weight-optimized reinforcement, in particular in the form of a disk having an appropriate pattern.

In the represented examples, it can also be provided to at least partially provide recesses in at least one of the partial carriers 38, 40, in order to obtain a sufficient rigidity or durability in combination with a weight reduction.

The invention was comprehensively described and explained with reference to the drawings and the description. The description and the explanation are to be understood as an example and are not to be understood as limiting. The invention is not limited to the disclosed embodiments. Other embodiments or variations result for a person skilled in the art within the scope of the utilization of the present invention and within the scope of a precise analysis of the drawings, the disclosure, and the following claims.

In the claims, the words "comprise" and "comprising" do not rule out the presence of further elements or steps. The indefinite article "a" does not rule out the presence of a plurality. The mere mention of a few measures in multiple various dependent claims is not to be understood to mean that a combination of these measures cannot also be advantageously utilized. Reference numbers in the claims are not to be understood as limiting.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 10 electric vehicle
12 driving wheels
14 drive shaft
16 drive train
18 electric vehicle transmission
20 gearwheel
22 electric prime mover
24 transmission component
26 pinion
28 output shaft of the electric prime mover
30 toothed ring
32 transmission housing
34 screw
36 housing
38 first partial carrier
40 second partial carrier
42 external toothing
44 cavity for housing component
46 toothed ring inner side
48 fastening section
50 bore hole
52 reinforcing means
D axial spacing

The invention claimed is:

1. An electric vehicle transmission (18) for an electric vehicle (10), comprising:
a pinion (26) drivingly connectable to an electric prime mover (22); and
a gearwheel arrangement with a gearwheel (20) engaged with the pinion, the gearwheel (20) comprising a gearwheel carrier and a toothed ring (30) having an external toothing (42), the toothed ring rotationally fixable to the gearwheel carrier,
wherein a center distance between a center of the pinion and a center of the gearwheel (20) is no less than fourteen and a half centimeters and no greater than twenty centimeters,
wherein the gearwheel carrier is formed by a first partial carrier (38) and a second partial carrier (40) that are at least partially axially spaced apart and extend from the toothed ring radially inward,
wherein at least a portion of an axial spacing (D) between the first and second partial carriers (38, 40) is greater than an axial length of the toothed ring,
wherein the gearwheel arrangement has a transmission ratio greater than eight, and
wherein one or both of:
the first partial carrier (38) has a profile in a radial direction that differs from the second partial carrier (40); and
the first partial carrier has a wall thickness that differs from the second partial carrier.

2. The electric vehicle transmission (18) of claim 1, wherein the first partial carrier (38) is formed by at least one section of a first housing section of a housing (36) for a transmission component (24), and the second partial carrier (40) is formed by at least one section of a second housing section of the housing (36) for the transmission component (24).

3. The electric vehicle transmission (18) of claim 2, wherein the housing (36) of the transmission component (24) defines a radial area between the transmission component and the toothed ring (30) such that a gearwheel diameter is greater than a radial length of the transmission component.

4. The electric vehicle transmission (18) of claim 2, wherein a ratio of a radial length of the housing (36) of the transmission component (24) with respect to a radial length of the transmission component is greater than two.

5. The electric vehicle transmission (18) of claim 2, wherein the transmission component (24) comprises a differential, and the housing (36) of the differential is formed from housing sections that are symmetrical.

6. The electric vehicle transmission (18) of claim 1, wherein the toothed ring (30) is connected to the gearwheel carrier in one or more of a form-locking, friction-locking, and force-locking manner.

7. The electric vehicle transmission (18) of claim 6, wherein the toothed ring (30) is connected to the gearwheel carrier by one or more of bonding, screwing, pressing, and welding the toothed ring to the gearwheel carrier.

8. The electric vehicle transmission (18) of claim 1, wherein one or more of:
the external toothing (42) has a module in the range from one millimeter to one and eight-tenths millimeters;
the external toothing has helical teeth having a helix angle β (beta) in the range from five degrees to forty-five degrees;
the toothed ring (30) has an outer diameter in the range from twenty-six centimeters to thirty-four centimeters;
the external toothing has a tooth depth in the range from one millimeter to two and a half millimeters; and
the toothed ring is made of metal.

9. The electric vehicle transmission (18) of claim 1, wherein one or more of:
the external toothing (42) has a module of one and fifty-one hundredths millimeters;
the external toothing has helical teeth having a helix angle B (beta) in the range from twenty degrees to thirty degrees;

the toothed ring (30) has an outer diameter in the range from twenty-six centimeters to thirty-one and forty-eight hundredths centimeters;

the external toothing has a tooth depth of one and a half millimeters; and the toothed ring is made of case hardened steel.

10. The electric vehicle transmission (18) of claim 1, wherein:

the external toothing has a spur gear tooth system or a bevel gear cutting; and the external toothing comprises an involute gearing.

11. The electric vehicle transmission (18) of claim 10, wherein the involute gearing has an addendum modification.

12. The electric vehicle transmission (18) of claim 1, wherein an outer diameter of the toothed ring has a ratio with respect to a shaft diameter of a shaft for the gearwheel in the range from six to seven and seven-tenths.

13. The electric vehicle transmission (18) of claim 1, wherein the center distance between the center of the pinion and the center of the gearwheel is in the range from seventeen and a half centimeters and eighteen centimeters.

14. The electric vehicle transmission (18) of claim 1, wherein the electric vehicle transmission has a single gear step established by the gearwheel arrangement.

15. The electric vehicle transmission (18) of claim 1, wherein the transmission ratio is eight and nine-tenths.

16. An electric vehicle (10), comprising:

the electric vehicle transmission (18) of claim 1;

a differential, wherein the toothed ring (30) is rotationally fixed to a housing (36) of the differential in order to form the gearwheel (20); and an electric prime mover (22), wherein the pinion (26) is arranged, in a rotationally fixed manner, at an output shaft (28) of the electric prime mover and is in engagement with the gearwheel in order to multiply an input power of the electric prime mover.

17. A gearwheel (20) for a gear step in an electric vehicle transmission (18), comprising:

a gearwheel carrier; and a toothed ring (30) having an external toothing (42), the toothed ring rotationally fixable to the gearwheel carrier, wherein the gearwheel carrier is formed by a first partial carrier (38) and a second partial carrier (40) that are at least partially axially spaced apart and extend from the toothed ring radially inward, wherein at least a portion of an axial spacing (D) between the first and second partial carriers (38, 40) is greater than an axial length of the toothed ring, and wherein one or both of the first partial carrier (38) and the second partial carrier (40) comprises a reinforcement in the form of a support grid arranged at the one or both of the first and second partial carriers (38, 40) in order to counteract axial loads acting upon the gearwheel during an operation of the electric vehicle transmission (18), the reinforcement having one or both of a honeycomb pattern and a waffle pattern.

* * * * *